United States Patent Office 3,484,268
Patented Dec. 16, 1969

3,484,268
NOVEL TRANSFER MEDIA AND METHOD OF
PREPARING SAME
Douglas A. Newman, Glen Cove, N.Y., assignor to
Columbia Ribbon and Carbon Manufacturing Co.,
Inc., Glen Cove, N.Y., a corporation of New York
No Drawing. Filed July 20, 1967, Ser. No. 654,710
Int. Cl. B41c 1/06; C08b 21/04
U.S. Cl. 117—36.1
10 Claims

ABSTRACT OF THE DISCLOSURE

Process for preparing novel squeeze-out type transfer elements from solvent-applied resinous compositions in which an activatable, solid, particulate blowing agent is included in the solvent-applied composition and is activated after partial or complete solvent evaporation to produce a durable ink layer of uniform porosity which has faster recuperative powers and which is cleaner to the touch and produces sharper, cleaner images than prior-known ink layers of squeeze-out type.

---

Transfer media such as carbon papers and typewriter ribbons on which the ink layer is based upon synthetic thermoplastic resinuous binder materials, as disclosed in United States Patents Nos. 2,984,582; 3,037,879 and 2,944,037, are in widespread commercial use as replacements for conventional transfer media having wax transfer layers because of their many advantages such as heat stability and their ability to form duplicate images which are sharper, more uniform and more smudgeproof than heretofore possible.

The known resin-binder transfer media of the aforementioned type are prepared by solvent coating methods whereby the resin is formulated with an incompatible oily material, coloring matter and a volatile solvent, coated onto a suitable flexible foundation, and the solvent is evaporated to form a pressure-sensitive transfer element on which the transfer layer comprises a porous, spongy, non-pressure-transferable network of the resin having all of the pores filled with the incompatible oily material and the coloring matter mixed together as a pressure-exudable, pressure-transferable ink.

The known solvent-produced squeeze-out type carbons and ribbons have certain inherent limitations which limit their utility and/or their degree of reuse. The porous structure of such prior-known elements is completely dependent upon the type of resin binder used and the amount of incompatible ink used. Softer resins such as vinyl chloride-vinyl acetate copolymers are not very tough or resistant to breakdown or deterioration under the effects of imaging pressure unless used in a high amount relative to the amount of incompatible ink vehicle. However, the lower the amount of ink vehicle, the fewer and smaller are the ink pores and the shorter is the effective life of the transfer element.

Harder resins such as polyvinyl butyral and styrene-methyl methacrylate copolymers have greater resistance to breakdown or deterioration but also are more resistant to the release of ink under imaging pressure. Higher amounts of ink must be used and this results in ink layers which are dirty to the touch.

Mixtures of hard and soft resin binders have been used as a compromise with some success. However, such mixtures have some of the same disadvantages of both types of resins and therefore leave room for improvement.

One additional limitation of prior-known transfer elements of the solvent-produced squeeze-out type is their lack of utility in the field of automatic scanning. In order for images to be reliably scannable, either by magnetic or optical means, they must be sufficiently high in magnetic or optical pigment content to have a high magnetic amplitude or optical density. They must also be sharp and smear-resistant. Prior-known squeeze-out elements produce the required sharpness and smear-resistance but do not exude sufficient pigment to produce the required amplitude or density. If the ink content is increased to the desired degree and soft resins are used, then the resin structure breaks down and the formed images are neither sharp nor smear-resistant. Harder resins do not liberate sufficient ink regardless of the ink content, and mixtures of resins possess both disadvantages.

As discussed in my aforementioned Patent No. 2,984,582, there are also "sweating" difficulties encountered with transfer media of this type whereby the incompatible oily material tends to migrate or ooze from the transfer layer, thereby staining articles in contact therewith and causing loss of writing strength. This problem was overcome to some extent according to my patent by the use of semi-solid materials in the ink phase, but the improved results are reduced as the temperature of the transfer media is increased since the additives have relatively low melting points.

Because of the "sweating" problem, there are limitations on the amount of incompatible oily material which may be incorporated into such resinous transfer layers. Prior transfer elements relied only on the oily material to form the pore structure in the layer because of its incompatibility with the resin binder. However, if too much oil is added the formed pores are to large and the transfer layer is too dirty for commercial application. If too little oil is added the transfer layer has insufficient writing strength since the oil is the nucleus of the pressure-transferable ink composition.

It is the principal object of the present invention to prepare solvent-produced squeeze-out type ink layers which have increased durability and increased imaging strength and which are capable of forming sharp, smear-resistant images having a high pigment content.

It is another object of the invention to prepare clean pressure-sensitive transfer media on which the resinous transfer layer may contain larger amounts of incompatible oily material and pigment than heretofore possible without loss of durability and cleanliness.

It is still another object to prepare transfer media of the aforementioned type in which the pore structure and imaging strength of the resinous transfer layer is not completely dependent upon the amount of incompatible oily material employed.

The objects and advantages of this invention are attained by the addition of a solid particulate blowing agent to a volatile solution of a resinous ink composition prior to its application to the flexible foundation sheet or casting surface, said blowing agent being decomposable to form a gas at a particular stage in the formation of the transfer layer after the transfer layer has been placed and at least the major amount of the volatile solvent has been evaporated and pore formation has been initiated by the incompatible oily material.

According to the preferred embodiment, this is accomplished by formulating the resinous coating composition to include the blowing agent together with a mixture of at least two volatile organic liquids, at least one of which evaporates at a relatively low temperature and is a true solvent for the particular resin employed while at least one other is less volatile, evaporates at a higher temperature than the true solvent, and is only a partial solvent which softens but does not dissolve the resin employed. The blowing agent is one which decomposes, preferably under the effects of heat, at a temperature between the evaporation temperatures of the true solvent and the partial solvent so that gas formation takes place after the resin and incompatible oil have formed into an initial porous structure but prior to the hardening of this structure. The volatile partial solvent or softener is present at the time of gas evolution and its maintains the resin in a soft, tacky or rubbery form. Activation of the fine particles of blowing agent throughout the ink layer results in the formation of interconnected pores of the desired size, depending on the particle size of the blowing agent, which absorb the ink by capillary action uniformly throughout the ink layer and relieve the pressure in the original pores.

Next the temperature is increased to evaporate the partial solvent and allow the resin structure to harden or set. Thus there is formed a pressure-sensitive transfer layer in which the pore volume exceeds the volume of incompatible oily material present. There is room within the porous structure of the layer for the incompatible material to expand or migrate without oozing or exuding from the layer surface, and by capillary action or some like force, the incompatible material remains well within the pore structure away from the surface of the layer so that the formed transfer medium is exceptionally clean to the touch.

The essence of this invention resides in the discovery of a novel method whereby predetermined amounts of particulate blowing agents of desired size may be added to solvent-applied resinous transfer layers to produce novel pressure-sensitive transfer layers having advantages over the known resinous transfer sheets in that they are exceptionally clean to the touch, have the ability to cleanly hold and retain within the pores thereof larger amounts of incompatible oily material than heretofore possible, have greater compressibility and ink-releasing ability, even when harder binders are used, due to the more uniform, fine porosity, and produce sharper, clearer images than heretofore possible when porosity was directly related to ink content.

No particular criticality exists with respect to the ingredients of the resinous transfer layer other than the solid particulate nature of the blowing agent. This invention applies to all of the synthetic thermoplastic resins, incompatible oils and oily materials, pigments and solvents disclosed in my aforementioned United States Patents Nos. 2,984,582 and 3,037,879, as well as related Patents Nos. 2,944,037, 3,117,018 and others.

In lieu of repeating all of the suitable resins, suffice it to say that the present invention applies to the use of any synthetic thermoplastic resinous binder material including the vinyl resins, hydrocarbon polymers, polyamides, polyurethanes, polycarbonates, acrylics and the like.

Preferred resins are those hard resins which heretofore have only been used in practice in combination with other softer resins. Such resins include polystyrene, copolymers of styrene and methyl methacrylate, polyvinyl butyral, polyvinyl chloride, polyurethanes produced by reacting a diisocyanate with a polyester such as an alkyd resin, and similar resinous materials.

As the incompatible oily material it is preferred to use one or more liquid oils of the animal, vegetable or mineral type or oily, fatty acids or esters heretofore used in the art. Semi-solid oily materials such as lanolin, petrolatum or hydrogenated vegetable oils may also be used preferably in combination with the liquid oils mentioned. However, liquid ink vehicles are preferred because of their ability to migrate within the ink layer.

In selecting the solvent system comprising the highly volatile solvent and the less volatile partial solvent according to the preferred embodiment, it should be understood that the identity of these materials varies greatly depending upon the solubility characteristics of the particular resin employed.

The highly volatile solvent preferably comprises from about 90% to about 50% by volume of the mixture of volatile liquids and is preferably an aliphatic ester, ether, alcohol or ketone having a boiling point below about 85° C., such as ethyl acetate, ethyl ether, ethyl alcohol, isopropyl alcohol, acetone, methyl ethyl ketone, and the like.

The less volatile liquid which is a partial solvent, which swells but does not dissolve the particular resin used, preferably comprises from about 10% to about 50% by volume of the volatile liquid mixture and has a boiling point of from about 100° C. to about 150° C. Suitable materials include the aromatic hydrocarbons such as toluene and the xylenes and the higher aliphatic esters, ethers, alcohols and ketones such as Cellosolve (2-ethoxy ethanol), Cellosolve acetate, diethyl ketone, pentanol, butyl alcohol, butyl acetate, and the like.

It is also possible to produce transfer elements according to the present invention in which a conventional solvent system is used and activation of the blowing agent occurs after evaporation of all of the solvent. Since the blowing agent is present in fine particulate or powder form and since the resin binder is flexible, the activation of the blowing agent forms small pores or cells of the desired size within the binder and the expansion of the blowing agent causes the cells to become interconnected with each other and with the ink-containing cells. Thus the ink is able to migrate within the resin structure and distribute itself more uniformly even though the ink layer is free of the volatile solvent.

No particular criticality exists with respect to the nature of the solid, particulate blowing agent used, the essential requirement being that, according to the preferred embodiment, it is decomposable to generate a gas at a temperature between the evaporation temperature of the particular highly volatile solvent and the less volatile partial solvent employed. In all cases this decomposition temperature will be above about 200° F. and below about 350° F.

Illustrative of the preferred blowing agents which may be used in accordance with the teachings of this invention are heat-activatable materials which have a particle size up to about 20 microns and which decompose under the effects of the prescribed temperature to generate a gas such as carbon dioxide, nitrogen, nitrogen oxides, or the like. Preferred for this purpose are the commercially available nitrosamines, particularly those containing two or more nitrosamine groups such as N,N-dinotroso-pentamethylene tetramine and N,N'-dimethyl-N,N'-dinitroso terephthalamide. Also suitable are p,p'-oxy-bis(benzenesulfonyl hydrazide) and diazoaminobenzene and other conventional solid blowing agents capable of pulverization. However, blowing agents activatable by means of steam, coreactant vapor such as acid vapor, ultraviolet radiation, or the like, may be used in place of heat-activatable materials. Also, larger particle sizes may be used depending on the thickness of the formed layer.

The coloring matter may comprise any of the pigments and/or dyestuffs conventionally used in the art. Toned pigments such as carbon black having dyestuff precipitated thereon are preferred. In cases where the transfer element is designed for magnetic sensing purposes, the coloring matter is a magnetizable pigment such as black iron oxide. Preferred magnetic pigments are those which have low oil-absorption capacity and have a high tap density because of their smooth surface and small particle size.

The following examples are set forth as illustrative of the composition suitable for producing the novel transfer sheets of this invention, it being understood that each example is drawn to a specific composition and that the proportion of the ingredients of each composition may be varied widely as indicated by the following table:

| Ingredients: | Parts by weight |
|---|---|
| (1) Synthetic thermoplastic resin binder | 10 |
| (2) Incompatible oily material | 12–50 |
| (3) Pigment or other coloring matter | 3–100 |
| (4) Highly volatile solvent | 20–90 |
| (5) Less volatile partial solvent | 0–30 |
| (6) Blowing agent | 0.01–1.0 |

EXAMPLE 1

| Ingredients: | Parts by weight |
|---|---|
| Styrene-methyl methacrylate copolymer (Zerlon 150) | 12.0 |
| Mineral oil | 9.0 |
| Refined rapeseed oil | 6.0 |
| Flushed alkali blue (60% mineral oil) | 4.6 |
| Lecithin | 0.1 |
| Black toner pigment | 6.2 |
| Celogen | 0.1 |
| Toluene | 21.0 |
| Ethyl acetate | 23.0 |
| Methyl ethyl ketone | 17.0 |

Celogen is a registered trademark of Naugatuck Chemical Co. for p,p′-oxy-bis(benzenesulfonyl hydrazide) blowing agent. The Celogen is used in the form of a fine powder which is first dispersed with the oils and coloring matter. The resin is dissolved in the solvents and then the mixture of oils, coloring matter and blowing agent is added to the resin solution and uniformly dispersed therein to form a composition of coatable consistency.

The composition is applied as a thin uniform layer to a flexible foundation sheet of polyethylene terephthalate polyester film and heated to an initial temperature of 190° F. to evaporate the ethyl acetate and methyl ethyl ketone. Thereafter the temperature is raised to 220° F. to activate the Celogen and cause the formation of nitrogen-filled pores throughout the soft resinous layer. Then the temperature is raised to 250° F. to evaporate the toluol and dry the ink layer.

The dried ink layer is exceptionally clean to the touch, even though it contains over twice as much ink as resin, due to the increased porosity of the resin binder which permits the ink to be more uniformly absorbed and retained therein.

EXAMPLE 2

| Ingredients: | Parts by weight |
|---|---|
| Polyvinyl butyral (Vinylite XYSG) | 10.0 |
| Mineral oil | 10.0 |
| Butyl stearate | 13.0 |
| Black iron oxide (MO–7029) | 25.0 |
| Du Pont B1–353 | 0.06 |
| Ethyl alcohol | 80.0 |
| Toluol | 20.0 |

Du Pont B1–353 is a registered trademark of E. I. Du Pont Company for N,N′-dimethyl-N,N′-dinitroso terephthalamide blowing agent.

The foregoing ingredients are uniformly mixed to a coatable consistency in the manner discussed in Example 1 and the composition is applied as a thin layer to a thin paper foundation sheet having thereon a thin resinous coating to receive the ink layer and prevent migration into the paper base. The applied layer is passed through a heating tunnel where it is subjected to hot air at a temperature of 250° F. to cause simultaneous evaporation of the volatiles and activation of the blowing agent.

The formed ink layer has improved cleanliness and produces sharper and clearer magnetizable typed images than corresponding carbon papers manufactured from the same ingredients but without the blowing agent. The magnetic amplitude of such images equals about 150% of the "May 27, 1958 Reference" standard established on a General Electric Magnetic Printing Tester.

The present invention also applies to the production of self-supporting squeeze-out type carbons and ribbons wherein the resinous ink solution is applied to a smooth casting surface and dried and thereafter stripped therefrom as a self-supporting, ink-releasing structure.

Variations and modifications may be made within the scope of the claims and portions of the improvements may be used without others.

I claim:
1. Process for the production of squeeze-out type transfer elements which comprises the steps of:
   (a) preparing a uniform resinous ink solution of coatable consistency including a synthetic thermoplastic resin, an oleaginous ink vehicle which is incompatible with said resin, coloring matter, finely divided solid activatable gas-liberating material and volatile organic solvent for said resin and ink vehicle,
   (b) applying said ink solution to a foundation as a thin layer,
   (c) heating said ink solution to at least partially evaporate the solvent and render the ink solution more viscous, and
   (d) activating the gas-liberating material whereby the finely divided material liberates gas to form small gas pockets within the resin, and the ink vehicle and coloring matter separate from the resin as an ink to form ink-filled pores which are associated with said gas pockets whereby the ink is able to migrate into said gas pockets and distribute itself more uniformly throughout said layer as a pressure-exudable ink.

2. Process according to claim 1 in which the volatile organic solvent comprises a miscible mixture of a highly volatile solvent in combination with a smaller amount of a less volatile material which is at least a partial solvent for the resin and the gas-liberating material is activatable after the evaporation of the volatile solvent and before the evaporation of the less volatile material, whereby the applied ink solution is heated to a first temperature sufficient to evaporate the said volatile organic solvent, then heated to a second higher temperature to activate said gas-liberating agent, and then heated to a third higher temperature to evaporate the less volatile material and dry the layer.

3. Process according to claim 2 in which the solvent mixture comprises aliphatic and aromatic solvents, said first temperature is below about 200° F. to evaporate said aliphatic solvent, said second temperature is below about 225° F. to activate said gas-liberating agent, and said third temperature is above about 230° F. to evaporate the said aromatic solvent and dry the layer.

4. Process according to claim 2 in which the volatile solvent mixture comprises from 90% to 50% by volume of the volatile organic solvent and 50% to 10% by volume of the less volatile partial solvent.

5. Process according to claim 1 in which the foundation is a thin flexible foundation which is retained as a support for the layer.

6. Process according to claim 1 in which the amount of oleaginous ink vehicle exceeds the amount of resin used.

7. Process according to claim 1 in which the gas-liberating agent is a heat-activatable nitrogenous compound which liberates a nitrogenous gas at a temperature between 200° F. and 350° F.

8. Process according to claim 1 in which the resin comprises a vinyl resin.

9. Process according to claim 1 in which the ingredients are present in the following relative proportions:

| Ingredients: | Parts by weight |
|---|---|
| Synthetic thermoplastic resin | 10 |
| Oleaginous ink vehicle | 12–50 |
| Coloring matter | 3–100 |
| Gas-liberating material | 0.01–1.0 |
| Volatile organic solvent | 20–120 |

10. A squeeze-out type pressure-sensitive transfer element produced according to claim 1.

References Cited

UNITED STATES PATENTS

| | | | |
|---|---|---|---|
| 3,055,297 | 9/1962 | Leeds | 117—36.1 |
| 3,117,018 | 1/1964 | Strauss | 117—36.1 |
| 3,330,791 | 7/1967 | Mater et al. | 117—36.1 |
| 3,413,187 | 11/1968 | Findlay et al. | 117—36.1 |

MURRAY KATZ, Primary Examiner

U.S. Cl. X.R.

117—235, 138.8; 161—160, 182